(12) United States Patent
Gaucher et al.

(10) Patent No.: US 11,465,593 B2
(45) Date of Patent: Oct. 11, 2022

(54) ADAPTER FOR CONNECTING A WIPER TO A DRIVE ARM OF A MOTOR VEHICLE WIPER SYSTEM

(71) Applicant: Valeo Systèmes d'Essuyage, Le Mesnil Saint Denis (FR)

(72) Inventors: Vincent Gaucher, Le Mesnil Saint Denis (FR); Stéphane Houssat, Issoire (FR); Olivier Jomard, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 187 days.

(21) Appl. No.: 16/333,503

(22) PCT Filed: Jul. 19, 2017

(86) PCT No.: PCT/EP2017/068179
§ 371 (c)(1),
(2) Date: Mar. 14, 2019

(87) PCT Pub. No.: WO2018/050325
PCT Pub. Date: Mar. 22, 2018

(65) Prior Publication Data
US 2019/0256053 A1  Aug. 22, 2019

(30) Foreign Application Priority Data
Sep. 14, 2016 (FR) .................................. 1658577

(51) Int. Cl.
*B60S 1/38* (2006.01)
*B60S 1/40* (2006.01)
*B60S 1/34* (2006.01)

(52) U.S. Cl.
CPC ........... *B60S 1/3865* (2013.01); *B60S 1/4048* (2013.01); *B60S 1/3447* (2013.01); *B60S 1/3849* (2013.01); *B60S 2001/4051* (2013.01)

(58) Field of Classification Search
CPC ........ B60S 1/3856; B60S 1/4048; B60S 1/38; B60S 1/40; B60S 2001/4051; B60S 1/3447; B60S 1/3849; B60S 1/3865
(Continued)

(56) References Cited

U.S. PATENT DOCUMENTS

2004/0211021 A1* 10/2004 Weber .................. B60S 1/3868
15/250.32
2006/0117515 A1  6/2006 Fink et al.
(Continued)

FOREIGN PATENT DOCUMENTS

CN  1484591 A   3/2004
CN  105270344 A  1/2016
(Continued)

OTHER PUBLICATIONS

Notification under Article 94(3) in corresponding European Application No. 17 75 641.6, dated Jul. 20, 2020 (6 pages).
(Continued)

*Primary Examiner* — Katina N. Henson
(74) *Attorney, Agent, or Firm* — Osha Bergman Watanabe & Burton LLP

(57) ABSTRACT

The subject of the invention is an adapter (100) intended to connect a wiper to a drive arm of a vehicle wiper system, the adapter (100) comprising a head (1) and a body (2) which extend in the continuation of one another in a longitudinal direction of the adapter (100), the adapter (100) comprising a means (6, 61) of rotational connection to a connector (8) attached to the wiper, the adapter (100) being formed at least by a top wall (10, 20) from which there extend at least two lateral flanks (11a, 11b, 21a) so as to delimit an internal volume (101) in which the connector (8) is able to extend, characterized in that the adapter (100) comprises at least one
(Continued)

Figure 1:
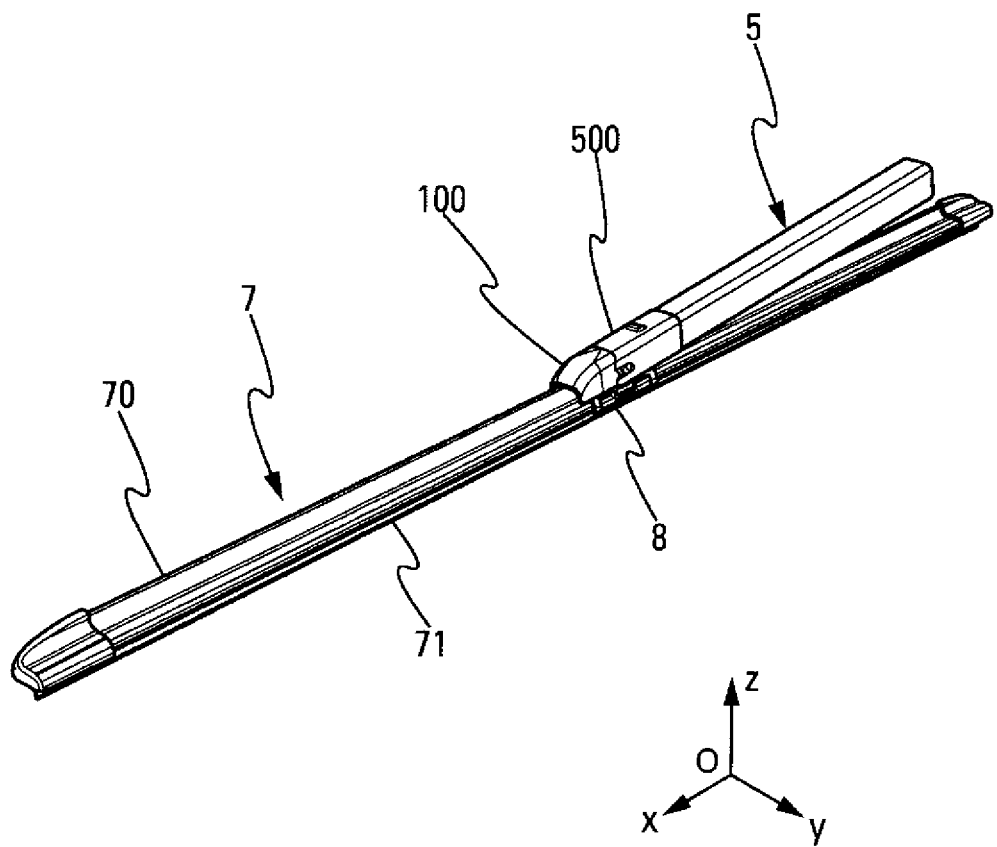

centering means (3) for centering it in a direction perpendicular to the top wall (10, 20) with respect to the drive arm.

19 Claims, 4 Drawing Sheets

(58) Field of Classification Search
USPC .......................................... 15/250.32, 250.38
See application file for complete search history.

(56) References Cited

U.S. PATENT DOCUMENTS

| | | | | |
|---|---|---|---|---|
| 2013/0239356 A1* | 9/2013 | Yoshimoto | ............ | B60S 1/3863 |
| | | | | 15/250.38 |
| 2015/0074934 A1 | 3/2015 | Houssat et al. | | |
| 2015/0151718 A1* | 6/2015 | Moll | ............... | B60S 1/4048 |
| | | | | 15/250.32 |
| 2016/0001745 A1* | 1/2016 | Yoshimoto | ............ | B60S 1/3867 |
| | | | | 15/250.38 |
| 2016/0107616 A1 | 4/2016 | Young, III et al. | | |

FOREIGN PATENT DOCUMENTS

| | | |
|---|---|---|
| DE | 10130903 A1 | 5/2002 |
| DE | 10257988 A1 | 2/2004 |
| DE | 102011001688 A1 | 10/2012 |
| JP | 2015-054610 A | 3/2015 |
| JP | 2015-214181 A | 12/2015 |
| WO | 2002-040328 A1 | 5/2002 |
| WO | 2017-136845 A1 | 8/2017 |

OTHER PUBLICATIONS

International Search Report issued in corresponding International Patent Application No. PCT/EP2017/068179, dated Nov. 8, 2017 (6 pages).
Written Opinion issued in corresponding International Patent Application No. PCT/EP2017/068179, dated Nov. 8, 2017 (8 pages).
Notification of Reasons for Rejection in corresponding Japanese Application No. 2019-514116, dated Feb. 14, 2020 (7 pages).
The First Office Action in corresponding Chinese Application No. 201780064058.4, dated Oct. 26, 2021 (14 pages).

* cited by examiner

ADAPTER FOR CONNECTING A WIPER TO A DRIVE ARM OF A MOTOR VEHICLE WIPER SYSTEM

The invention relates to the domain of wiping and/or cleaning the glazed surfaces of a motor vehicle and relates more specifically to a connection device between a windscreen wiper blade and a drive arm thereof.

Windscreen wipers for motor vehicles are designed to sweep away liquid and dirt that may obstruct the driver's view of the surrounding environment. These windscreen wipers usually comprise at least one drive arm performing an angular to-and-fro movement against a glazed surface of the vehicle, and at least one wiper blade fitted with rubbers made of an elastic material. By rubbing against this glazed surface, this rubber sweeps away the water and some of the dirt from the driver's field of vision.

Regardless of the design of the windscreen wiper blade (articulated yokes that hold the rubber at several different points, or a metal blade that holds the rubber over the entire length thereof, for example) the windscreen wiper blade is attached to the drive arm of the wiper system by a connection assembly that usually has at least one connector and one adapter. The connector is rigidly connected to the wiper blade and the adapter is a part that is designed firstly to cooperate with the connector and secondly to engage with an end portion, or clevis, of the drive arm. The connector and the adapter cooperate to attach the wiper blade to the drive arm and to form an articulated joint between these two assemblies.

In the aftermarket for motor vehicle parts and accessories, it is known to sell a given blade fitted with a connector that can be adapted to several types of drive arm. It is therefore useful to design an adapter that can be used with as many different types of arm clevises and as many different types of blade connectors as possible, since it is the adapter that forms the interface between these two elements.

The present invention is intended to propose a solution enabling a wiper blade to be connected to a specific type of drive arm clevis for a wiper system of a motor vehicle, said clevis having, perpendicular to the lengthwise extension thereof, an inverted U-shaped section in which the vertical branches are formed by two side walls of this clevis and in which the transverse branch is formed by a top wall of said clevis. The top wall and the side walls of this clevis thus together delimit a receiving volume for the adapter according to the invention.

More specifically, the specific clevis to which the invention relates has two ports, each arranged longitudinally on one of the side walls of the clevis from a free front edge of this side wall, the free front end forming the end by which the adapter according to the invention is inserted into this clevis. These ports can advantageously be part of the link between the adapter and the drive arm. However, the mechanical constraints in the manufacture of the drive arm, and notably of the clevis thereof, limit the precision of the dimensional tolerances of these ports, and consequently a reliable connection with the adapters ordinarily available on the after-sale market for spare parts and accessories for wiper systems cannot always be guaranteed. In some cases, the adapter cannot be mounted on the clevis as a result of these tolerance discrepancies.

The invention is intended to propose an adapter that enables the efficient use of these ports to center this adapter 100 with the drive arm, notably regardless of the dimensional tolerance of the ports, such centering being applied in a vertical direction.

To achieve the objective set, the invention proposes an adapter that includes a body and a head that are arranged in succession in a longitudinal direction, each of which comprises a top wall from which two lateral flanks extend perpendicular to said wall.

In accordance with convention, in this document the term "longitudinal" shall refer to the direction in which the head and the body of the adapter according to the invention lie in succession, the term "transverse" shall refer to a direction substantially perpendicular to the longitudinal direction joining the lateral flanks of the adapter according to the invention, and the term "vertical" shall refer to the direction perpendicular both to the longitudinal direction and to the transverse direction, i.e. perpendicular to the top wall of the adapter.

In a wiper system comprising a wiper blade fitted with a connector and assembled using an adapter according to the invention to a clevis of a drive arm of said wiper system, the terms "lower" and "bottom" shall refer more specifically to the regions closest to the surface to be wiped in the vertical direction, and the terms "upper" and "top" shall refer to the regions further away from said surface, in the same vertical direction.

With reference to these different directions, the shape of the section, in a vertical transverse plane, of the head and of the body of the adapter according to the invention is substantially an inverted "U" formed by the top wall thereof, from which the two vertical or substantially vertical lateral flanks of this head and/or of this body extend, perpendicularly or substantially perpendicularly. The top wall and the lateral flanks of the head and of the body of the adapter according to the invention together delimit an internal volume thereof.

According to one of the main features thereof, the adapter according to the invention has centering means that are designed to cooperate with the drive arm, notably with at least one of the ports arranged in at least one of the side walls of a clevis of the type defined above. This centering is performed in a direction perpendicular to a plane through which a top wall of the adapter passes.

Advantageously, these centering means are arranged on at least one of the lateral flanks of the adapter, more specifically on one of the lateral flanks of the head of this adapter. Also advantageously, these centering means also block the adapter in the clevis in the same direction perpendicular to the top wall. In this regard, the centering means can also be referred to as means for blocking the adapter in the drive arm in the aforementioned direction.

Each lateral flank of the head carries one centering means, notably a single centering means per lateral flank.

Advantageously, the interface between the body and the head of the adapter according to the invention forms a shoulder, the dimensions of the shoulder being substantially equal to the thickness of the side walls of the clevis of the drive arm with which the adapter is designed to cooperate. According to one embodiment of the invention, this shoulder extends between the top walls respectively of the head and of the body of the adapter, thus forming a peripheral flange at the interface between this head and this body.

If the transverse dimension of the head or of the body of the adapter according to the invention is defined as the distance, in a plane substantially parallel to the plane of the top wall of this head or of this body, measured between the surfaces of these lateral flanks located on the outside of the internal volume of the adapter, the transverse dimension of the head of the adapter according to the invention is greater than the transverse dimension of the body of the adapter according to the invention. Equally, if the height of the head or of the body of the adapter according to the invention is defined as the dimension, measured in a plane substantially parallel to the plane of the lateral flanks of this head or of this body, between the surface of the top wall on the outside of the internal volume of the adapter and the bottom edge of the lateral flanks, the height of the head of the adapter according to the invention is greater than the height of the body thereof. In other words, the head is higher and/or wider than the body of the adapter according to the invention.

According to an advantageous feature of the invention, the centering means are arranged from the shoulder formed at the interface between the lateral flanks of the head and of the body of the adapter, notably emerging therefrom.

These centering means extend longitudinally from the lateral flank that carries said centering means, beyond this shoulder towards the body of the adapter according to the invention.

Advantageously, the centering means extend transversely from the lateral flank of the body adjacent to the lateral flank of the head from which same emerges.

According to an advantageous feature of the invention, these centering means have a curved shape in the longitudinal direction, in which the apex of the curve is oriented towards the body of the adapter.

According to one embodiment of the invention, these centering means thus are in the form of a disk portion, that is for example centered on the lateral flank of the head of the adapter carrying said centering means. Such a disk portion is thus delimited by a face aligned with an external face delimiting the lateral flank of the head.

Advantageously, the transverse dimension of these centering means, i.e. the thickness thereof that extends transversally beyond the body of the adapter according to the invention, is identical or substantially identical to the transverse dimension of the shoulder forming the interface between a lateral flank of the head and a lateral flank of the body. Thus, these centering means are not a projecting portion on the outer surface, opposite the internal volume defined above, of the lateral flank carrying said centering means.

The adapter according to the invention also advantageously includes, in the region of the body thereof, means for enabling rotational connection to a connector of a wiper system. According to one example embodiment, these rotational linking means are formed by at least one cylindrical trunnion centered on a substantially transversal axis of rotation that is parallel to the top wall of the body and substantially perpendicular to the lateral flanks thereof. These rotational linking means can be two coaxial cylindrical trunnions.

Advantageously, this substantially cylindrical trunnion extends from at least one lateral flank of the body of the adapter according to the invention into the portion of the internal volume of said adapter that is the limited by the top wall and by the vertical flanks of this body, close to the interface between the head and the body of this adapter. This trunnion is advantageously designed to cooperate with a connector associated with a wiper blade during connection of said blade to the adapter according to the invention. More specifically, this trunnion is designed to be engaged in a receiving orifice formed in said connector.

According to one variant embodiment, the rotational linking means comprise at least two cylindrical openings of circular or square section formed in each lateral flank of the body of the adapter. These openings cooperate with a connector associated with a wiper blade during connection of said blade to the adapter according to the invention. More specifically, each of these openings is designed to be engaged on a trunnion integral with the connector, or on a shaft connected to the connector.

According to another embodiment, the rotational linking means comprise on one side a single trunnion arranged on one of the lateral flanks of the body and a single opening formed in the other lateral flank of the body.

According to the variant embodiments mentioned above, the dimensions of the centering means are advantageously determined so that the centering means do not block this opening when arranged on the same side of the adapter.

This embodiment is not however exclusive, and any means enabling a rotational link between the adapter according to the invention and a connector of a wiper blade can be used without adversely affecting the invention.

The adapter according to the invention can be improved by providing a cheek coming from the head that extends longitudinally along the body and transversally at a distance from the body. This distance can for example be equal to a thickness of the wall forming the clevis.

According to a variant embodiment, the centering means described above can be associated with a cylindrical or substantially cylindrical lug arranged on the corresponding lateral flank of the body of the adapter according to the invention. In this case, the shape and/or the dimensions and/or the arrangement of such a lug are advantageously determined such that, when engaging the adapter according to the invention in the receiving volume delimited by the top and side walls of the clevis with which this adapter is designed to cooperate, this lug engages in the port arranged in the corresponding side wall. This provides a longitudinal guide for the adapter in the clevis.

If the adapter according to the invention is assembled with a drive arm including the clevis of the type described above, the body of this adapter is engaged in the receiving volume of this clevis. In this movement, the top wall of this body bears, inside this receiving volume, against the top wall of the clevis, and the side walls thereof advantageously act both as longitudinal and transversal guide means and as transversal blocking means for the adapter 100 inside this receiving volume. To do so, the external dimensions, notably of the body of the adapter according to the invention, are advantageously determined to enable this guidance and this blocking. In other words, the external dimensions of the body of the adapter according to the invention are advantageously determined to enable easy but tight insertion, i.e. without excessive play, of said body into the receiving volume delimited by the top wall and by the side walls of the clevis of the drive arm with which this adapter is designed to cooperate. Advantageously, the dimensions of the centering means and the arrangement thereof on the lateral flank carrying said centering means are determined such that, when the body of the adapter according to the invention is received in the receiving volume of the clevis, these centering means at least partially block the mouth of the port formed in the corresponding side wall of this clevis at the free end of this clevis.

In this assembly, the centering means are arranged to bear against the free edges of the mouth of such a port. It can therefore be easily understood that, on account of the size and exact configuration of this port, the curved shape of the centering means cause said centering means to engage, to a greater or lesser extent, in this opening, in all cases ensuring contact with the free edges thereof. The centering and optionally the blocking of the adapter according to the invention is thus achieved. Once bearing against the edges of the mouth of this port, no relative movement, in the vertical direction defined above perpendicular to the top wall of the head of the adapter according to the invention is possible. The invention thus achieves the stated objective.

The adapter can include longitudinal blocking means arranged to longitudinally lock the adapter in the clevis, which ensures contact between the centering means and the edges of the mouth of the port.

According to different embodiments, there can be just one centering means of the adapter according to the invention, i.e. carried by just one of the lateral flanks of the head of this adapter.

The centering means as described above can also be arranged on each lateral flank of the head of the adapter according to the invention, for a clevis in which each side wall has a port as defined above.

The adapter according to the invention also advantageously includes, in the region of the body thereof, rotational linking means between the adapter according to the invention and a connector of a wiper system.

According to one embodiment, these rotational linking means comprise at least one cylindrical trunnion centered on a substantially transversal axis of rotation parallel to the top wall of this body, and substantially perpendicular to the lateral flanks thereof, and extend from at least one lateral flank of the body of said adapter inside the internal volume of said adapter delimited by the top wall and by the lateral flanks of said body. This trunnion is advantageously designed to cooperate with a connector associated with a wiper blade during connection of said blade to the adapter according to the invention. More specifically, this trunnion is designed to be engaged in a receiving orifice formed in such a connector. On account of the foregoing, these rotational linking means are positioned longitudinally on the adapter according to the invention between the shoulder and one longitudinal rear end of the adapter.

According to one embodiment of the invention, an opening is formed in the opposite lateral flank of the body of the adapter according to the invention, facing this trunnion. This embodiment is not however exclusive, and any means enabling a rotational link between the adapter according to the invention and a connector of a wiper blade, for example two trunnions, two openings or the addition of a metal shaft, can be used without adversely affecting the invention.

The invention also relates to a connection device including an adapter as described in this document and a connector designed to be rigidly connected to a wiper blade, characterized in that the adapter and the connector are linked by rotational linking means.

Advantageously, the rotational linking means between the adapter and the connector is a single trunnion arranged from an inner face of at least one of the lateral flanks of the body extending towards the inside of the internal volume.

Alternatively or additionally, the rotational linking means between the adapter and the connector is an orifice formed in at least one of the lateral flanks of the body of the adapter.

Finally, the invention relates to a wiper system, notably for a motor vehicle, including a wiper blade, a drive arm and an adapter as described in this document or a connection device as mentioned above, in which the adapter cooperates with a clevis of the drive arm, characterized in that the centering means enter a port arranged in a side wall of the clevis to center the adapter in relation to the clevis.

Advantageously, the adapter has at least one cheek that covers the port of the clevis.

It can be seen that a curved shape of the centering means bears against the edges arranged at the intersection between a mouth of the port and a free edge of the clevis.

Figure 2:
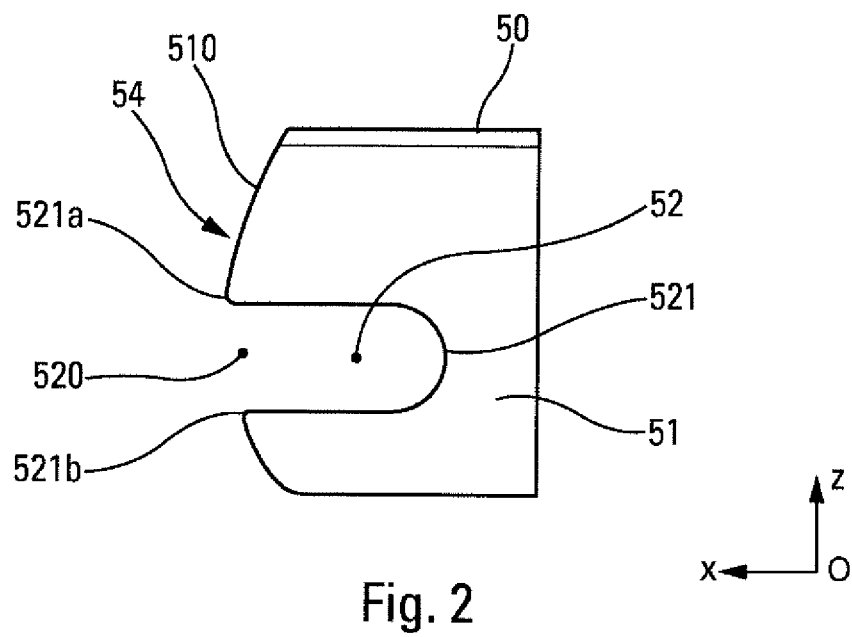
Figure 3:
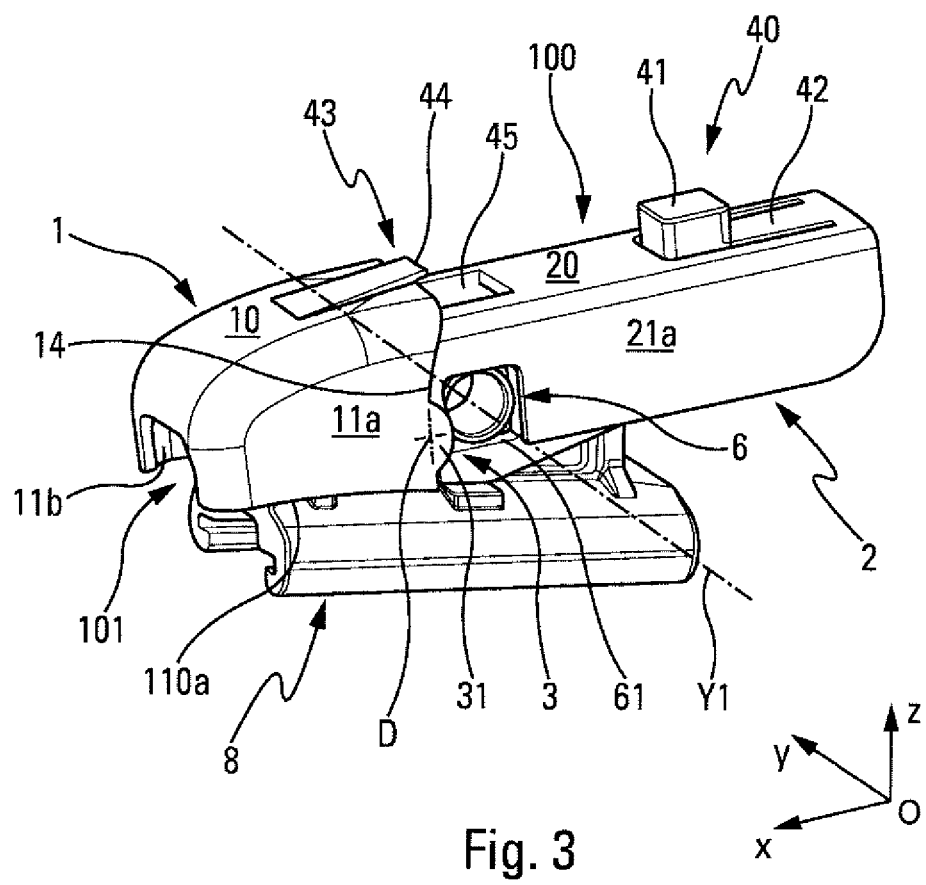
Figure 4:
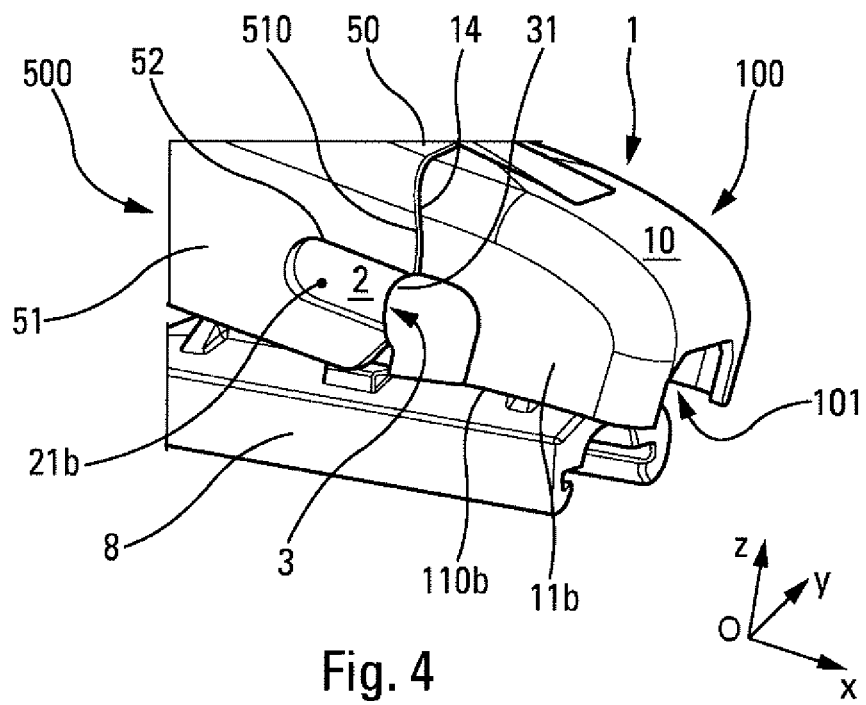
Figure 5:
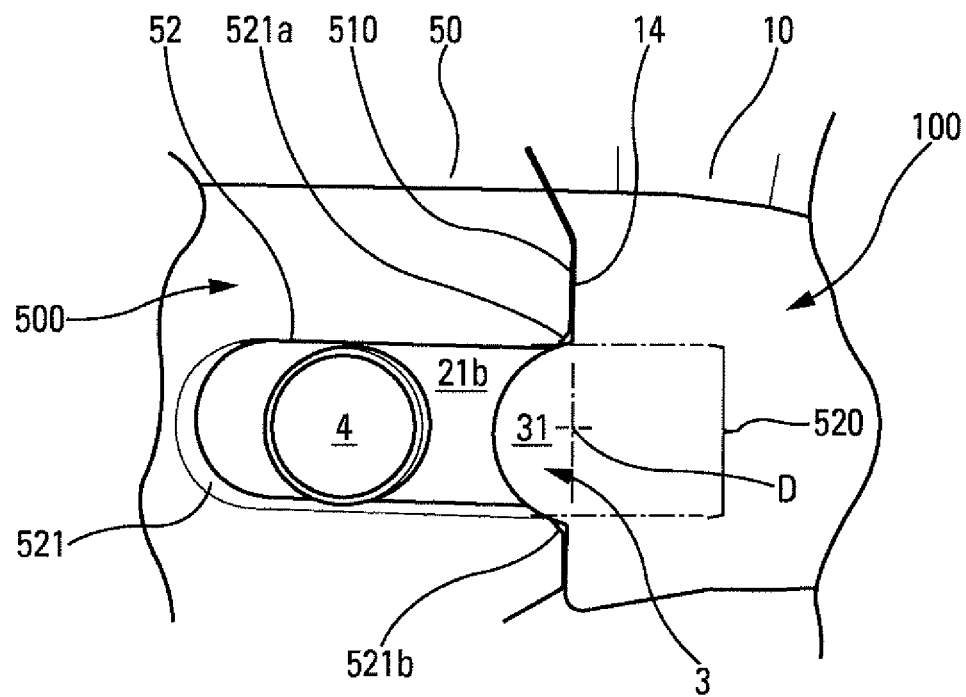
Figure 6:
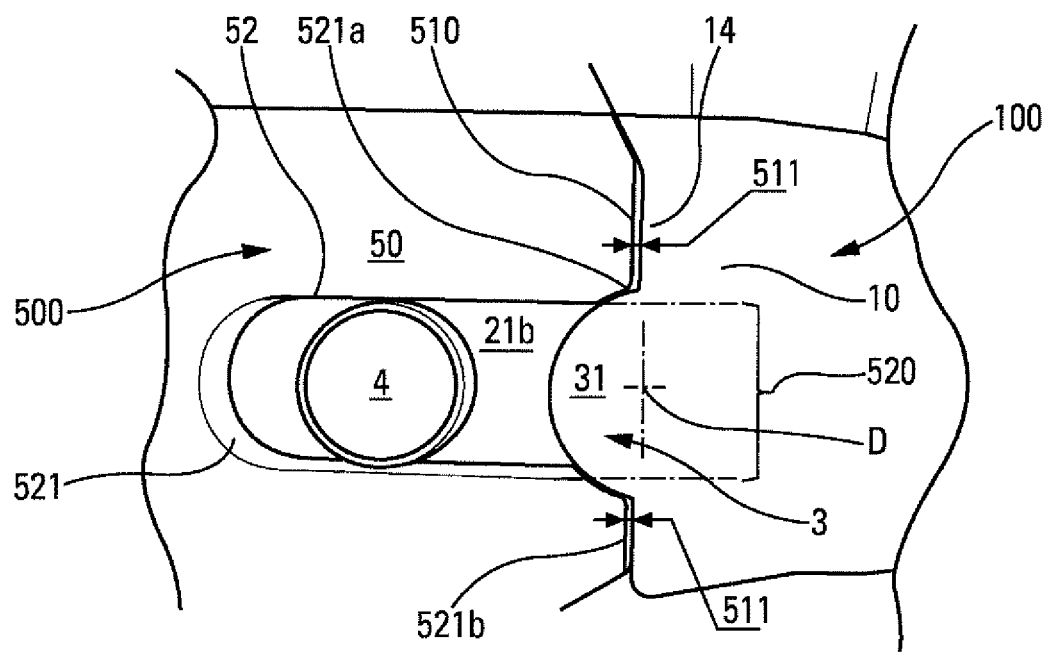
Figure 7:
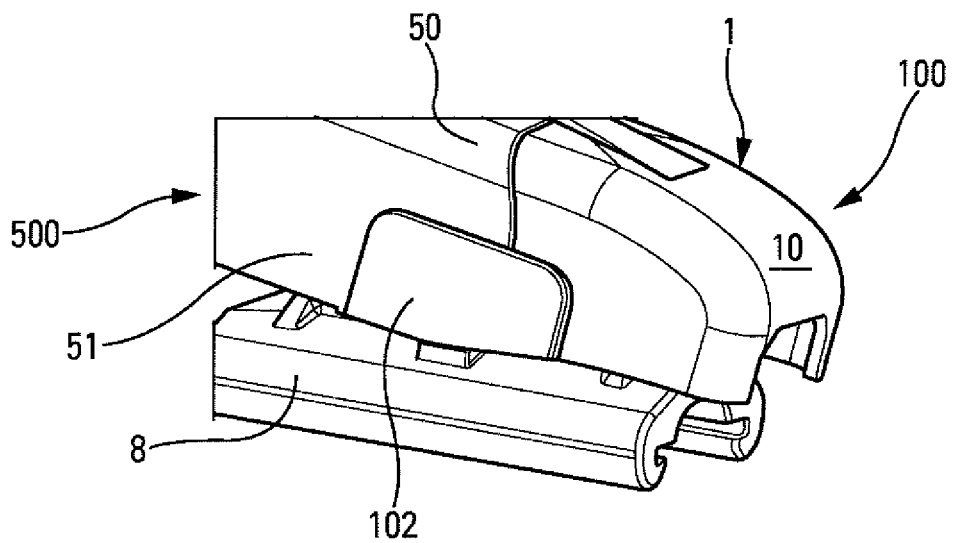

Other features and advantages of the present invention are explained more clearly in the description below and the drawings, in which:

FIG. 1 is a perspective view of a drive arm assembled with a wiper blade forming a wiper system for a motor vehicle, FIG. 2 is a side view of the end of one drive arm clevis with which the adapter according to the invention is designed to cooperate, FIG. 3 is a perspective view of the adapter according to the invention assembled with a connector, FIG. 4 is a partial perspective view of an adapter according to the invention assembled with such a connector and with such a clevis, FIG. 5 is a magnified view of FIG. 4 showing the centering means in use with a clevis with dimensions at maximum tolerance, FIG. 6 is a magnified view of FIG. 4 showing the centering means in use with a clevis with dimensions at minimum tolerance, and FIG. 7 is a partial perspective view of an option fitted to the adapter according to the invention.

It should first be noted that the figures show the invention in detail to enable the invention to be carried out, and these figures may naturally be used to better define the invention where appropriate. It should also be noted that, in all of the figures, similar elements and/or elements performing the same function are indicated using the same reference sign.

Furthermore, with reference to the orientations and directions defined above, the longitudinal direction shall be represented in all of the figures by the axis (Ox), the transverse direction shall be represented by the axis (Oy), And the vertical direction shall be represented by the axis (Oz). These different axes together provide an orthonormal frame (Oxyz) shown in the different figures. In this frame, the "front" orientation is defined by the positive direction of the axis (Ox), the "rear" orientation is defined by the negative direction of the same axis, and the terms "top" and "upper" are represented by the positive direction of the axis (Oz), while the terms "bottom" and "lower" are represented by the negative direction of this same axis (Oz).

FIG. 1 shows a wiper system for motor-vehicle. This system comprises a drive arm 5 that performs an angular to-and-fro movement against the surface to be wiped, and a wiper blade 7 comprising in this case a joint 70 carrying a rubber 71 made of an elastic material. In the angular to-and-fro movement of the drive arm 5, the wiper blade 7 and the rubber 71 thereof are driven in an angular movement against the glazed surface to perform the desired wiping/cleaning operation. The wiper blade 7 is attached to the drive arm 5 by a connection assembly that includes a connector 8 and an adapter 100. The connector is rigidly connected to the wiper blade 7 and the adapter 100 provides an interface between this connector 8 and an end portion of the drive arm 5, also referred to as the clevis 500. The connector 8 and the adapter 100 cooperate to attach the wiper blade 7 to the drive arm 5 and to form an articulated joint between these two elements.

The invention relates to a particular type of adapter 100 that is designed to cooperate with a particular type of drive arm clevis 500, notably in order to provide spare parts for windscreen wiper assemblies in which the drive arm has this particular type of clevis 500.

The clevis 500, shown schematically in the side view in FIGS. 2 and 4 to 7, with which the adapter 100 according to the invention is designed to cooperate, includes a top wall 50 and two side walls 51 that extend substantially perpendicularly from said top wall 50. The clevis 500 thus has at least one straight section, the shape of which is substantially an inverted "U" in which the base is formed by the top wall 50 and the branches are formed by the side walls 51. The top wall 50 and the side walls 51 of this clevis 500 together delimit a receiving volume 54.

The clevis 500 has a port 52 in at least one of the side walls 51 thereof. Advantageously, a port 52 is formed in each of the side walls 51 of the clevis 500. The clevis 500 therefore has two ports 52.

Each of these ports extends substantially in a direction parallel to the top wall 50 of the clevis 500 in the direction of the drive arm 5, of which the clevis 500 forms the end portion. The port 52 extends from a free edge 510 of the corresponding side wall 51, the free end that forms the receiving end of the adapter in a wiper system comprising such a drive arm.

Each port 52 therefore opens out on the free edge 510 of the side wall 51 in which the port is formed as an orifice 520. To facilitate manufacture, a back 521 of each port 52, within the side all 51 in which this port is formed, is advantageously curved. According to the embodiment more specifically illustrated in the figures, the back is substantially shaped as a semicircle centered inside the corresponding port 52.

With reference to FIGS. 2 to 7, the adapter 100 according to the invention has a head 1 and a body 2 that extend longitudinally and in succession one after the other along the axis (Ox) defined above. With reference to the directions and orientations defined above, the head 1 extends forwards from the adapter 100 according to the invention, and the body 2 extends backwards from this same adapter 100. According to one embodiment of the invention, the adapter 100 is formed by injecting a polymer material into a mold to form a one-piece part.

As shown in these figures, the body 2 is formed by a top wall 20, a first lateral flank and a second lateral flank that are substantially vertical, indicated respectively using reference signs 21a and 21b, each extending from a longitudinal side of the top wall 20 substantially perpendicular thereto. According to the embodiment illustrated in the figures, the longitudinal dimension of the body 2 is greater than the transverse dimension thereof.

The head 1 is formed by a top wall 10, a first lateral flank and a second lateral flank that are substantially vertical, indicated respectively using reference signs 11a and 11b, each extending from a longitudinal side of the top wall 10 substantially perpendicular thereto.

The first lateral flank 11a of the head 1 and the first lateral flank 21a of the body 2 are shown in FIG. 3, while the second lateral flanks, respectively 11b and 21b, of the head 1 and of the body 2 are shown in FIG. 4. The head 1 and the body 2 therefore each have, in a vertical transverse plane parallel to the plane (Oyz) of the frame defined previously, a straight section in the form of an inverted "U" in which the transverse branch is formed by the top walls, respectively 10 and 20, and in which the vertical branches are formed by the lateral flanks, respectively 11a, 11b and 21a, 21b, of these two portions of the adapter 100 according to the invention.

The top walls, respectively 10 and 20, of the head 1 and of the body 2 of the adapter 100 according to the invention thus delimit, with the lateral flanks respectively 11a, 11b and 21a, 21b, of this head and of this body, an internal volume 101 of this adapter, shown schematically in FIGS. 3 and 4.

According to an advantageous feature of an embodiment of the invention, a transverse dimension, i.e. the dimension along the axis (Oy) defined above, of the head 1 is slightly greater than the transverse dimension of the body 2 measured in the same direction. In other words, the head 1 forms, at the interface thereof with the body 2, a shoulder 14 that is substantially parallel to the vertical transverse plane (Oyz) of the orthonormal frame defined above, extending from the head 1 and returning towards the body 2. The lateral shoulder 14 thus extends, according to this embodiment of the invention, around the entire periphery of the interface between the head 1 and the body 2 of the adapter according to the invention.

According to one embodiment of the invention, the vertical and transverse dimensions of this shoulder 14 are substantially equal respectively to the thickness of the top wall 50 of the clevis 500 and to the thickness of the side walls 51 of this same clevis 500 with which the adapter 100 according to the invention is designed to cooperate, such that the front edge 510 of this clevis 500, notably as shown in FIG. 4, can bear against this shoulder 14. These features provide a head 1 that is flush with the external faces of the clevis 500.

According to the invention, the adapter 100 has at least one means 3 for centering the adapter with the clevis 500 in the direction of the axis (Oz) defined above, i.e. perpendicular to a top wall of the adapter, notably the top wall 10 of the head 1 or the top wall 20 of the body 2.

With reference to FIG. 3, these centering means 3 are carried on the first lateral flank 11a of the head 1 of the adapter 100, extending the head 1 on the body 2. FIG. 4 shows an embodiment in which the centering means 3 are arranged on the second lateral flank 11b of the head 1 of the adapter 100. Naturally, the description provided below with reference to the arrangement of such centering means 3 on the first lateral flank 11a of the head 1 applies symmetrically to the arrangement of such centering means on the second lateral flank 11b of the same head 1.

With reference to these figures, these centering means 3 extend longitudinally towards the body 2 of the adapter according to the invention from the lateral flank 11a, 11b that carries said centering means, and beyond this lateral shoulder 14. More specifically and with reference to FIG. 3, these centering means 3 form an extension of the lateral flank 11a in the longitudinal direction of the axis (Ox), this extension partially covering the corresponding first lateral flank 21a.

According to the embodiment of the invention more specifically illustrated in the figures, the transverse dimension, i.e. the dimension along the axis (Oy) defined above, of the centering means 3 is substantially equal to the transverse dimension of the head 1. Thus, these centering means 3 do not project in the transverse direction from the outer surface of the lateral flank 11a or 11b carrying said centering means.

According to another feature of the invention, the centering means 3 have a curved shape, in which the apex of the curve is oriented towards the body 2 of the adapter 100. The curved shape is in this case an arched edge that delimits the centering means 3.

More specifically, these centering means 3 are in the form of a disk portion 31 in which the center D is located on the lateral flank 11a, 11b carrying the centering means. According to the embodiment of the invention more specifically illustrated in the figures, the center D of this disk portion 31 is located, along the axis (Oz) defined above, along the path that the shoulder 14 would take in the absence of the centering means 3. In other words, the disk portion that forms these centering means 3 is advantageously, but not exclusively, a half disk in which the diameter is for example in the plane (Oyz) of the shoulder 14. Advantageously, the centering means 3 are positioned, along the axis (Oz) defined above, between the top wall 10 of the head 1 of the adapter 100 and a bottom edge 110a, 110b of the lateral flank 11a, 11b carrying the centering means, the bottom edge 110a, 110b being opposite the edge by which this lateral flank is attached to the top wall 10.

FIG. 3 also shows the existence of a locking device 40 that is designed to longitudinally block the adapter 100 in the clevis of the drive arm. This locking device 40 holds the adapter 100 against the clevis, notably by holding a stop between the shoulder 14 and the free edge 510 of the clevis.

This locking device 40 is in the general form of a pad or button 41 arranged in the vicinity of a rear longitudinal end of the adapter 100 according to the invention, that is opposite the head 1 of this adapter. This pad 41 is arranged at the end of a flexible tab 42 and is formed by a distal wall that is advantageously substantially parallel to the top wall of the body 2 of the adapter according to the invention, with a set of side walls extending from this distal wall in the direction of said top wall 20 of the body 2 of the adapter 100 according to the invention.

According to one embodiment of the invention, this pad 41 has a substantially parallelepiped shape and therefore has four side walls that extend from the distal wall thereof towards the body 2 of the adapter 100. Advantageously, the distal wall of the pad forming the first blocking means of the adapter according to the invention extends outside the internal volume 101 delimited by the top walls and lateral flanks of the head 1 and of the body 2 of said adapter. The locking means 40 can therefore be retracted by rotation about a hinge located between the pad 41 and the rear longitudinal end of the adapter 100.

FIG. 3 also shows the presence of additional means 43 for securing the attachment of the adapter 100 in the clevis. According to an example embodiment, such additional means 43 are in the form of a static tooth 44. Such a tooth 44 emerges from the top wall 10 of the head 1 and extends along the axis (Ox) above the top wall 20 of the body 2. The tooth 44 and the top wall 20 are arranged to face one another such as to clamp the top wall 50 of the clevis.

According to an example embodiment, the adapter 100 includes a longitudinal aperture 45 formed in the top wall 20 of the body 2 of the adapter 100 according to the invention, extending from the shoulder 14 towards the rear longitudinal end of the adapter 100.

More specifically, FIG. 4 shows the assembly of the adapter 100 according to the invention with a clevis 500 of the type described above and shown in FIG. 2. In FIG. 4, the adapter 100 according to the invention is shown assembled with a connector 8 of a wiper blade. The means for carrying out this assembly are described below.

When assembling the adapter 100 according to the invention with a clevis 500 of the type described above, the body 2 of the adapter 100 is inserted into the receiving volume of the clevis 500. In this movement, the top wall of the body 2 bears, inside this receiving volume, against the top wall 50 of the clevis 500, and the side walls 51 thereof act both as longitudinal and transversal guide means and as transversal blocking means for the adapter 100 inside this receiving volume. To do so, the external dimensions, notably of the body 2 of the adapter 100 according to the invention, are advantageously defined to enable this guidance and this blocking. In other words, the external dimensions of the body 2 of the adapter 100 according to the invention are advantageously less than the internal dimensions of the receiving volume defined above, thereby enabling easy but tight insertion, i.e. without excessive play.

As shown in FIGS. 5 and 6, the dimensions of the centering means 3 and the arrangement thereof on the lateral flank lie, lib carrying said centering means are determined such that, when the body 2 of the adapter 100 according to the invention is received in the receiving volume of the clevis 500, these centering means 3 block the mouth 520 of the port 52 formed in the side wall 51 of this clevis 500. In other words, the dimension of the centering means 3 along the axis (Oz) defined above is advantageously greater than the dimension of the mouth 520 of the port 52 measured along the same axis (Oz).

More specifically and as shown more specifically in FIG. 5 or 6, in the assembly of the adapter 100 according to the invention with a clevis 500 of the type described above and shown in FIG. 2, the centering means 3 bear against the edges, respectively 521a and 521b, of the mouth 520 of the port formed in the corresponding side wall 51 of the clevis 500. On account of the foregoing and as a function of the exact configurations and dimensions of this port 52, and in particular as a function of the manufacturing tolerance of this port 52 along the axis (Oz) defined above, the curved shape of the centering means 3 oriented towards the body 2 engages to a greater or lesser extent in the port 52 through this mouth 520.

This is shown in FIGS. 5 and 6, which show the cooperation of a given adapter 100 with two clevises of identical shape, but in which the dimensions, in particular the dimensions of at least one port 52, are at maximum tolerance in FIG. 5 and at minimum tolerance in FIG. 6.

In these two cases, the centering means 3 come into contact with the edges 521a and 521b of the mouth 520. Once the centering means 3 are bearing against the edges 521a, 521b of the mouth 520 of this port 52, all relative movement of the adapter 100 in relation to the clevis 500 along the axis (Oz) defined above is prevented. The invention thus ensures that the adapter is centered in relation to the drive arm. The curved shape oriented towards the body 2 of the centering means 3, the apex of the curve then being oriented towards the back 521 of the port 52, ensures the guidance and vertical centering of the head 1 of the adapter 100 in the clevis 500, notably when the shoulder 14 is stopped against the top wall 50 and/or the side walls 51 of the clevis 500. Indeed, regardless of the configurations and exacts dimensions of the port 52 in relation to the manufacturing tolerances thereof, at least one portion of the curved shape of the centering means 3 is in simultaneous contact with the two edges 521a, 521b of the mouth 520 of the port 52.

In FIG. 5, a portion of the free edge 510 of the clevis 500 that extends on either side of the port 52 comes into contact with a portion of the shoulder 14 that extends on each side of the centering means 3. There is therefore no play between these two portions.

In FIG. 6, the centering means 3 have penetrated the port 52 to a lesser extent than in the situation shown in FIG. 5. The portion of the free edge 510 of the clevis 500 that extends on either side of the port 52 is removed from a portion of the shoulder 14 that extends on each side of the centering means 3. There is then play 511 between these two portions.

The centering means 3 as described above can also insure the vertical blocking of the adapter 100 in the clevis 500 of the drive arm 5.

FIG. 7 shows an embodiment of the adapter 100 that is identical to the adapter shown in FIG. 4, and reference shall be made to the detailed description thereof to make said adapter. Additionally, the adapter 100 in FIG. 7 has at least one cheek 102 that performs a concealing function, notably covering and concealing the port 52.

The adapter 100 can have a single cheek 102, although the adapter can also have two cheeks 102 formed on either side of the adapter 100.

The cheek 102 for example emerges from the head, being formed as a single part therewith during the molding operation for the adapter. The cheek 102 extends longitudinally along the axis (Ox) and vertically along the axis (Oz), beside the body 2. In other words, the cheek 102 is parallel or substantially parallel to the side wall that delimits the body of the adapter 100.

As shown, the cheek 102 is also arranged transversely at a distance from the body of the adapter 100. This forms a space between the cheek 102 and the body 2 of the adapter, and this space is occupied by the side wall 51 of the clevis 500 when the adapter 100 is mounted in the clevis.

It should be noted that, once the adapter 100 according to the invention is assembled with the clevis 500 of the drive arm 5, the top walls, respectively 50 and 10, of this clevis 500 and of the head 1 of this adapter, as well as the side walls 51 of this clevis and the lateral flanks 11 of the head 1 of this adapter advantageously form a continuous surface, thereby enhancing the appearance of the whole and eliminating any zones in which debris, dirt or particles potentially harmful to the correct operation of the assembly could accumulate.

For assembly with a connector 8 rigidly connected to a wiper blade 7, as shown in FIG. 1, the adapter 100 according to the invention has rotational linking means for connection to the connector 8. According to one example of these rotational linking means a trunnion, and advantageously only one trunnion, is arranged from an inner surface of at least one of the lateral flanks 21a, 21b of the body 2 extending transversally inside the internal volume 101. Such a trunnion is substantially cylindrical and centered on a transverse axis of rotation Y1 of said adapter. Advantageously, the transverse axis of rotation Y1 passes through the body 2 of the adapter 100 according to the invention close to the shoulder 14.

Advantageously, the lateral flank 21a, 21b of the body 2 opposite the lateral flank from which the substantially cylindrical trunnion extends includes a window 61 that is substantially centered on the transverse axis of rotation Y1. As shown in FIG. 3, the opening 61 being formed in the first lateral flank 21a of the body 2 corresponding to the first lateral flank 11a of the head 1 carrying the centering means 3, the dimensions of the centering means 3 are advantageously determined such that said centering means do not block the open 61.

The assembly of the adapter 100 according to the invention with a connector 8 rigidly connected to a wiper blade is then carried out by engaging the substantially cylindrical trunnion with a matching orifice of the connector 8. It should nonetheless be noted that any equivalent means may be used without adversely affecting the invention. Thus, without limitation, it is possible for two substantially cylindrical trunnions centered on this same transverse axis of rotation Y1 to be arranged to face one another inside of the internal volume 101 of the adapter to cooperate with a through-hole formed in the connector 8, or for this link to be carried out by cooperation of trunnions arranged on the connector 8 with one or more orifices formed in the lateral flanks of the adapter according to the invention and centered on this same transverse axis Y1. Nonetheless, in this latter case, the dimensions of the single or multiple centering means 3 are advantageously determined so that the centering means do not block said orifices. Finally, such rotational linking means can be formed by orifices formed both in the adapter and in the connector, with the shaft, for example a metal shaft, installed in these orifices.

The invention thus provides simple, easily implemented means to ensure the simple and efficient centering and optionally blocking, in the vertical direction defined above, of an adapter 100 with a drive arm 5 including a specific clevis 500 of the type described above. However, the invention is not limited to the means and arrangements described and illustrated, but also applies to any equivalent means or arrangements and any combination of such means.

In particular and according to different variant embodiments, the adapter 100 according to the invention can include a single centering means 3 as described in this document or two centering means, each one being arranged on one of the lateral flanks 11a, 11b of the head 1 thereof.

According to other variant embodiments, a transverse lug 4 is shown in FIGS. 5 and 6. Such a transverse lug 4 can be arranged on the lateral flank or flanks 21a, 21b of the body 2 of the adapter 100 according to the invention, extending the corresponding centering means 3 longitudinally. During assembly of the adapter 100 according to the invention with a clevis 500 of the type described herein, this lug 4 provides a first engagement and a first guide shape for this adapter 100 inside the corresponding port 52 of the clevis 500.

Following final assembly of the adapter 100 in the clevis 500, at least one transverse lug 4 becomes passive in that said lug ceases to help hold the adapter 100 in the port 52 along the axis (Oz), and more generally inside the clevis 500. The external diameter thereof is less than the height of the port 52 measured along the axis (Oz). The lug 4 nonetheless forms an additional securing member in the event of disengagement or failure of the clamping of the adapter 100 in the clevis 500, along the same axis (Oz).

In this case, the lug 4 has a circular section, but the invention is not limited to this specific shape.

The invention claimed is:

1. An adapter for connecting a wiper blade to a drive arm of a vehicle wiper system, the adapter comprising:
a head;
a body arranged in succession in a longitudinal direction of the adapter;
rotational linking means for connection to a connector rigidly connected to the wiper;
at least one top wall from which at least two lateral flanks extend to delimit an internal volume into which the connector can extend; and
at least one centering means that centers the adapter in a direction perpendicular to the top wall with respect to the drive arm,
a static tooth configured to clamp a clevis of the drive arm between the body and the static tooth,
wherein the adapter cooperates with the clevis of the drive arm,
wherein the centering means enters a port arranged in a side wall of the clevis that centers the adapter in relation to the clevis,
wherein, in the direction perpendicular to the at least one top wall, a dimension of the centering means is greater than a dimension of a mouth of the port, and
wherein the static tooth extends longitudinally from the head of the adapter and above the body of the adapter such that the static tooth and the body are arranged to face each other, wherein the static tooth is separated from the body, in the direction perpendicular to the at least one top wall, by a shoulder that extends around an entire periphery of an interface between the head and the body.

2. The adapter as claimed in claim 1, wherein the centering means are carried by at least one of the lateral flanks of the adapter.

3. The adapter as claimed in claim 2, wherein each lateral flank of the head carries one centering means.

4. The adapter as claimed in claim 2, wherein the centering means are arranged longitudinally towards the body from the lateral flank carrying said centering means, beyond a shoulder formed at an interface of the head and the body.

5. The adapter as claimed in claim 4, wherein the centering means form, beyond the shoulder and towards the body, a longitudinal extension of the lateral flank carrying said centering means.

6. The adapter as claimed in claim 5, wherein the centering means extend transversely from the lateral flank of the body adjacent to the lateral flank of the head from which the centering means emerges.

7. The adapter as claimed in claim 6, wherein the centering means have a curved shape in the longitudinal direction, in which an apex of the curve is oriented towards the body of the adapter.

8. The adapter as claimed in claim 7, wherein the centering means have a shape of a disk portion.

9. The adapter as claimed in claim 8, wherein the centering means are a half-disk, a center of which passes through a plane containing the shoulder.

10. The adapter as claimed in claim 1, further comprising at least one cheek emerging from the head and extending longitudinally along the body and transversely at a distance from said body.

11. The adapter as claimed in claim 1, wherein the centering means form means for blocking the adapter in the drive arm in the direction perpendicular to the top wall of the adapter.

12. A connection device comprising:
the adapter as claimed in claim 1; and
a connector rigidly connected to a wiper blade,
wherein the adapter and the connector are linked by rotational linking means.

13. The connection device as claimed in claim 12, wherein the rotational linking means between the adapter and the connector is a single trunnion arranged from an inner face of at least one of the lateral flanks of the body extending towards an inside of the internal volume.

14. The connection device as claimed in claim 12, wherein the rotational linking means between the adapter and the connector is an orifice formed in at least one of the lateral flanks of the body of the adapter.

15. The wiper system as claimed in claim 1, wherein the adapter has at least one cheek that covers the port of the clevis.

16. The wiper system as claimed in claim 15, wherein a curved shape of the centering means bears against edges of the clevis arranged at an intersection between the mouth of the port and a free edge of the clevis.

17. The wiper system as claimed in claim 1, further comprising a transverse lug arranged on the body of the adapter, the transverse lug being configured to enter the port arranged in the side wall of the clevis and secure the adapter in the direction perpendicular to the top wall.

18. An adapter for connecting a wiper blade to a drive arm of a vehicle wiper system, the adapter comprising:
a head;
a body arranged in succession in a longitudinal direction of the adapter;
rotational linking means for connection to a connector rigidly connected to the wiper;
at least one top wall from which at least two lateral flanks extend to delimit an internal volume into which the connector can extend;
at least one centering means that centers the adapter in a direction perpendicular to the top wall with respect to the drive arm;
a static tooth configured to clamp a clevis of the drive arm between the body and the static tooth;
a transverse lug arranged on the body of the adapter;
wherein the adapter cooperates with the clevis of the drive arm;
wherein the centering means and the transverse lug enter a port arranged in a side wall of the clevis that centers the adapter in relation to the clevis;
wherein, in a direction perpendicular to the at least one top wall, a dimension of the centering means is greater than a dimension of a mouth of the port;
wherein the static tooth extends longitudinally from the head of the adapter and above the body of the adapter such that the static tooth and the body are arranged to face each other; and
wherein the transverse lug is configured to secure the adapter in the direction perpendicular to the top wall.

19. The adapter as claimed in claim 18, wherein the static tooth is separated from the body, in the direction perpendicular to the at least one top wall, by a shoulder that extends around an entire periphery of an interface between the head and the body.

* * * * *